United States Patent [19]

Kovacic

[11] Patent Number: 4,754,695
[45] Date of Patent: Jul. 5, 1988

[54] PASSENGER COMPARTMENT VENT FOR AN AUTOMOTIVE VEHICLE

[75] Inventor: Todd E. Kovacic, Warren, Mich.

[73] Assignee: General Motors Corporation, Detroit, Mich.

[21] Appl. No.: 92,375

[22] Filed: Sep. 2, 1987

[51] Int. Cl.$^4$ .............................................. B60H 1/24
[52] U.S. Cl. ...................................... 98/2.14; 49/193; 98/2.18
[58] Field of Search ............... 49/193; 98/2, 2.14, 98/2.18; 296/216, 223

[56] References Cited

U.S. PATENT DOCUMENTS

| 2,159,516 | 5/1939 | Ball ........................................ 98/2.14 |
| 2,517,303 | 8/1950 | Green ........................................ 98/8 |
| 3,760,707 | 9/1973 | Kelly ........................................ 98/2.18 |
| 3,888,165 | 6/1975 | Hattass et al. ........................... 98/2.14 |
| 4,522,115 | 6/1985 | Kelly et al. ............................. 98/2.14 |

FOREIGN PATENT DOCUMENTS

| 38735 | 7/1931 | France. |
| 2150212 | 6/1985 | United Kingdom ................ 98/2.14 |

Primary Examiner—Harold Joyce
Attorney, Agent, or Firm—William A. Schuetz

[57] ABSTRACT

A vehicle roof mounted ventilator having a support, a cover and an operating mechanism for selectively moving either the front or rear of the cover between open and closed positions. The operating mechanism includes a pair of links pivotally connected to the cover at one end and to a cam follower at its other end, a horseshoe shaped cam for slidably receiving the cam followers and a rotatable knob for rotating the cam in opposite directions to selectively effect movement of one of the links while the other remains stationary due to its associated cam follower riding in the bight portion of the horseshoe shaped cam.

10 Claims, 2 Drawing Sheets

PASSENGER COMPARTMENT VENT FOR AN AUTOMOTIVE VEHICLE

The present invention relates to a ventilator and, more particularly, to a ventilator for an automotive vehicle having a closure member whose forward and rearward ends can be selectively raised to allow ingress and egress of air to and from an interior passenger compartment of the vehicle.

Heretofore various roof mounted ventilators for automotive vehicles have been provided in order to ventilate an interior passenger compartment in the vehicle. These known ventilators have included a closure member or cover and an operating mechanism operatively connected therewith for moving the same between open and closed positions. Examples of such ventilators are shown in U.S. Pat. Nos. 2,517,303; 3,888,165 and French addition Pat. No. 38,735. It is also known to provide ventilators having operating mechanisms which are selectively operable to raise either the front or rear ends of the cover or closure member, as desired. Examples of such ventilators are shown in U.S. Pat. Nos. 2,159,516 and 4,522,115. These latter patents, however, show fairly complicated ventilator structures including operating mechanisms requiring a large number of links or, as in the case of U.S. Pat. No. 4,522,115, over center springs.

Accordingly, in accordance with the provisions of the present invention, a novel ventilator for an automotive vehicle, such as a roof mounted ventilator, to permit ingress and egress of ambient air to and from a passenger or occupant compartment of the vehicle is provided which is of a very simple and economical construction, can be readily installed, does not require close manufacturing tolerances, can be readily manually actuated via a rotatable knob which does not protrude very far into the interior compartment of the vehicle, and which is operable to selectively move a closure member or cover thereof to one open position in which it admits or allows ingress of fresh air into the vehicle and another open position in which it allows egress or extraction of hot air or smoke from the inside of the vehicle.

Accordingly, it is a broad object of the present invention to provide a new and improved ventilator for an automotive vehicle, such as a roof mounted ventilator, to permit ingress and egress of air to and from a vehicle passenger compartment and which is of a very simple and economical construction, can be readily installed, does not require close tolerances, can be readily manually actuated via a rotatable knob which does not protrude very far into the passenger compartment of the vehicle, and which is operable to selectively move a cover or closure member of the ventilator to one open position in which it admits or allows ingress of fresh air into the vehicle and another open position in which it allows egress or extraction of hot air and smoke from inside the passenger compartment of the vehicle.

A further object of the present invention is to provide a new and improved ventilator for an automotive vehicle, as defined in the next preceding object, and in which the vehicle has body structure provided with a ventilating opening in a wall thereof and in which the ventilator comprises a support means carried by the vehicle body structure, a cover or closure member supported by the support means for movement between a closed position in which it closes off the opening, a first open position in which its front end thereof is disposed outwardly of the body structure to admit fresh air into the passenger compartment of the vehicle and a second open position in which a second or rear end thereof is disposed outwardly of the body structure to permit egress of air from the passenger compartment of the vehicle, and an actuating means operatively connected with the closure member for effecting movement thereof between its positions, and wherein the actuating means includes first and second cam followers operatively connected with the first and second ends of the closure member, respectively, and a rotatable horseshoe shaped cam operatively connected with the first and second cam followers and which selectively functions when rotated in opposite directions from a given position in which the closure member is closed to respectively move the first and second ends of the closure member from its closed position towards its open position when the other end thereof remains in a closed position.

Yet another object of the present invention is to provide a new and improved ventilator for an automotive vehicle, as defined in the next preceding object, and wherein the rotatable horseshoe shaped cam has first and second leg portions and an intermediate curved bight portion, and in which the rotatable cam has a first position in which its first and second leg portions thereof adjacent the bight portion are engageable with the first and second cam followers when the closure member is in its closed position and with the first and second leg portions of the cam respectively affecting movement of the first and second cam followers while the other cam follower rides in the bight portion thereof when the cam is rotated in opposite directions from its first position to respectively affect movement of the first and second ends of the closure member from its closed position towards its open position while the other end remains in a closed position.

A still further object of the present invention is to provide a new and improved ventilator for an automotive vehicle, as defined in the next preceding object, and in which the first and second cam followers ride in a linearly extending guide track extending longitudinally of the vehicle to constrain the path of movement of the cam followers and in which the first and second cam followers have depending portions extending through an elongated slot in the guide track and are received within the cam track of the cam and in which the first and second cam followers are operatively connected with the front and rear ends of the closure member via links pivotally connected to the cam followers and the closure member.

Yet another object of the present invention is to provide a new and improved ventilator for an automotive vehicle, as defined in the penultimate object, and in which the opening in the body structure of the vehicle is defined by peripherally extending outer and inner walls and with the inner wall supporting the peripherally extending deflectable elastomeric seal for engaging the closure member along its underside adjacent its outer peripheral edges, and in which the end of the closure member not being opened rocks or pivots on the seal means as the other end is moved between its open and closed positions.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
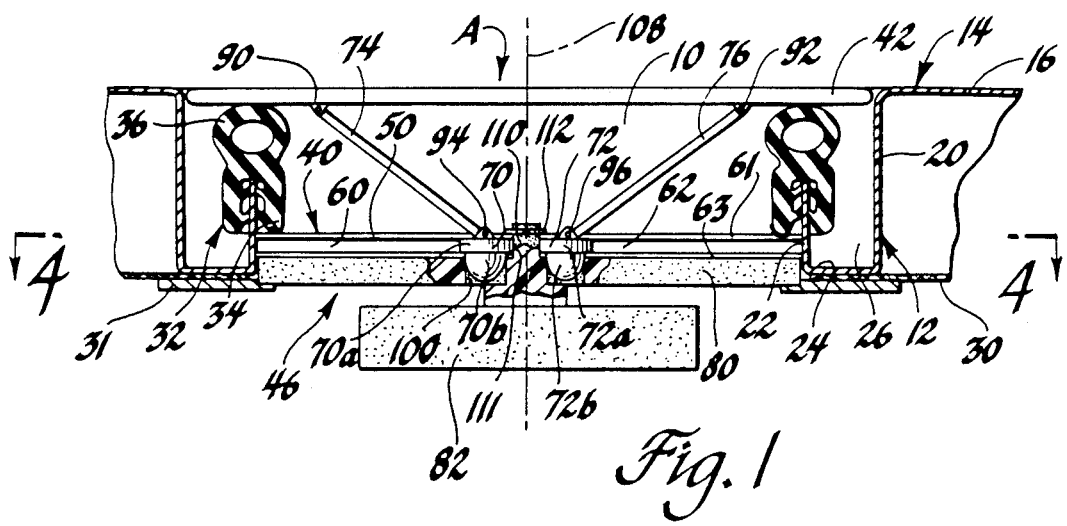
FIG. 1 is a fragmentary cross sectional view, with portions shown in elevation, of a preferred embodiment of the novel ventilator of the present invention and showing the same mounted to a roof structure of an automotive vehicle.

Referring to the drawings, a novel ventilator or ventilator means A for opening and closing an opening 10 defined by a wall means 12 in a roof or roof body structure 14 of an automotive vehicle is thereshown. The roof body structure 14 comprises an outer or exterior metal panel 16 which is suitably stamped to provide a generally rectangularly shaped opening 10 therein and the wall means 12. The wall means 12 is integral with the exterior panel 16 and includes a vertically extending outer wall 20, a vertically extending inner wall 22 spaced inwardly therefrom and defining the opening 10 and a generally horizontal bottom wall 24. As shown in FIG. 1, the inner wall 22 is of a lesser height than the outer wall 24 and the inner and outer walls 22 and 20 and the bottom wall 24 defined a peripherally extending channel or trough 26 extending around the opening 10, and for a reason to be hereinafter more fully described. The roof body structure 14 also includes a conventional inner panel or headliner 30 which is suitably secured to the outer roof panel 16 and an escutcheon plate or molding 31 surrounding the opening 10 on the interior of the vehicle and secured to the headliner 30.

The roof body structure 14 additionally includes a seal or seal means 32 which is mounted on the inner wall 22 of the wall means 12 and which extends along its entire periphery. The seal or seal means 32 has a lower body portion 34 which is slotted and suitably press fitted onto the inner wall 22 and an upper portion 36 disposed above the inner wall 22 and which is hollow and readily deformable or deflectable, and for a reason to be hereinafter more fully described.

Figure 2:
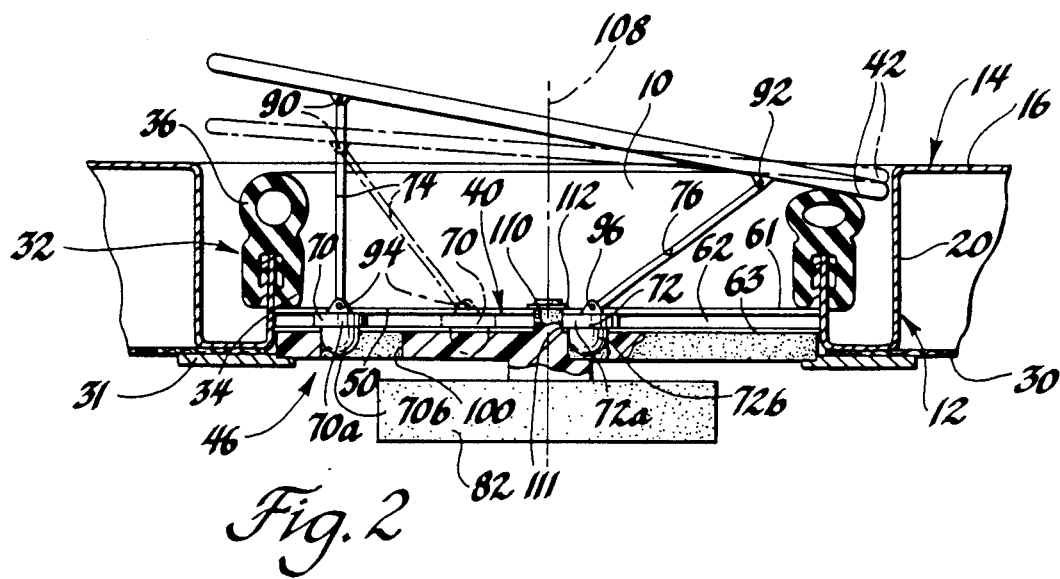
FIG. 2 is a view like that shown in FIG. 1, but showing different parts thereof in different positions.
Figure 3:
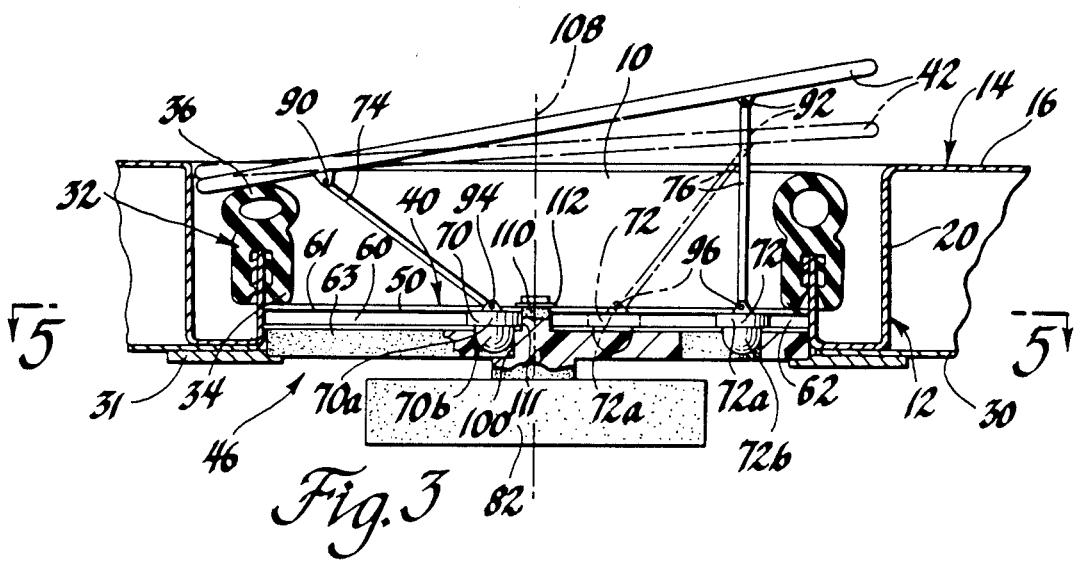
FIG. 3 is a view like that shown in FIG. 1, but showing different parts thereof in different positions.

The novel ventilator A of the present invention comprises, in general, a support means 40 carried by the wall means 12, a cover or closure member 42 and an actuating or operating mechanism or means 46 supported by the support means 40 and operatively connected with the closure member 42. The actuating mechanism 46 is selectively operable to move the closure member 42 between a closed position, as shown in FIG. 1, to either a first or front open position, as shown in FIG. 2, to permit ingress of outside air into the passenger compartment of the vehicle while the rear or second end of the closure member 42 remains in a closed position in engagement with the seal 32, or a second or rear open position, as shown in FIG. 3, in which egress of air from the passenger compartment of the vehicle is permitted and during which the front end of the closure member remains in engagement with the seal 32.

Figure 4:
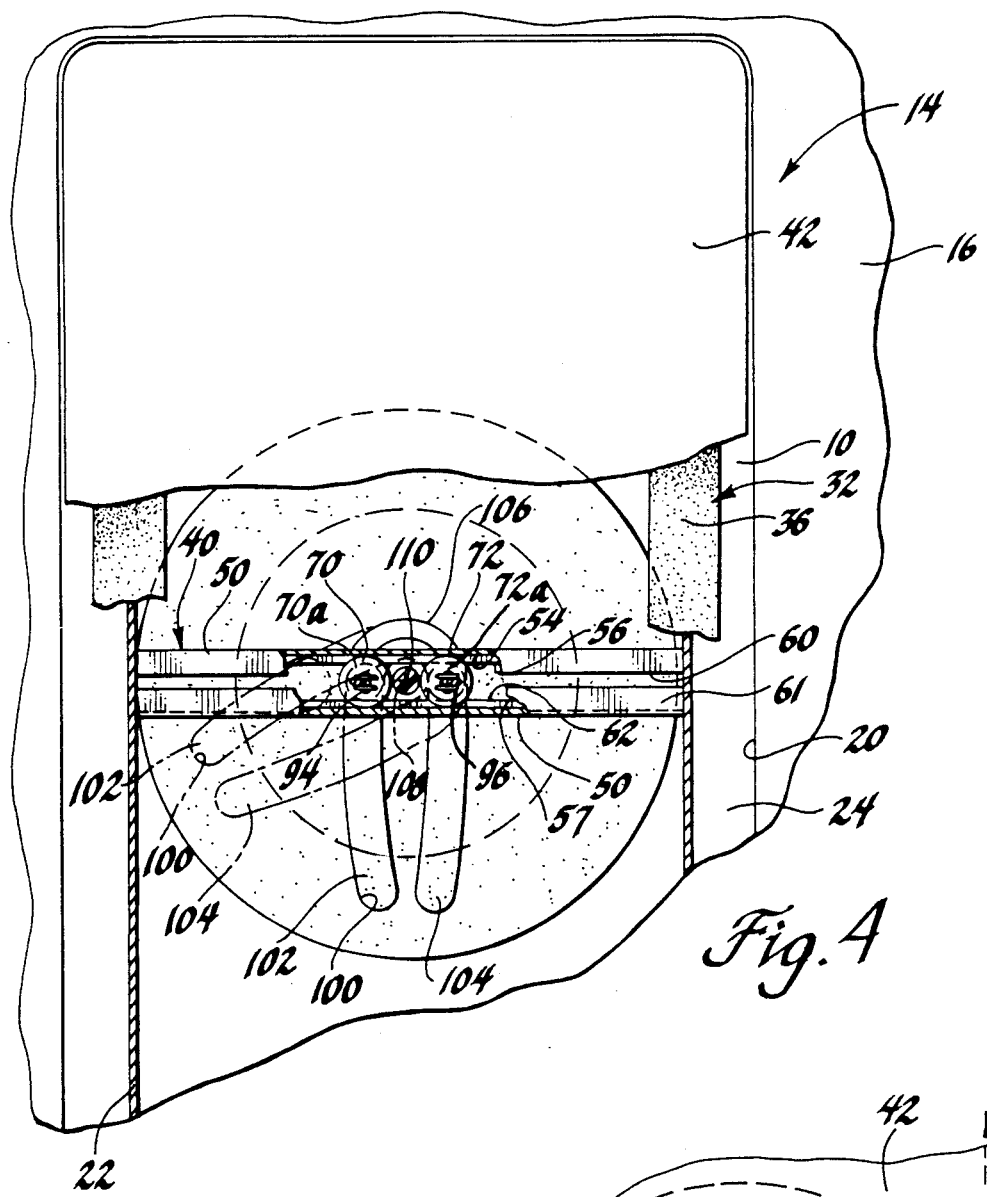
FIG. 4 is a fragmentary sectional view taken along the line 4—4 of FIG. 1.

The support means 40 comprises a linearly extending guide track means 50 having its opposite ends suitably rigidly secured, such as by welding, to the front and rear side wall portions of the inner wall 22 of the wall means 12. The support means 40 is relatively narrow in width, is horizontally disposed and extends longitudinally of the vehicle. The support means 40, as best shown in FIG. 4, has side walls which are stepped to define upper and lower guide tracks 54 and 56 and an intermediate ledge 57. The support means 40 also has a narrow, elongated linear slot 60 in its top side 61 and an elongated linear slot 62 in its bottom side 63, which is wider than the slot 60, and for reasons to be hereinafter more fully described.

The closure member 42 comprises a cover which is shaped complementary with the outer wall 20 defining the opening 10. The cover 42 is hereshown as being generally planar and could be made of any suitable material. The cover 42 could also be opaque or could be in the form of a Plexiglas sunroof. The cover 42 at a location spaced slightly inwardly from its peripheral side edges engages the seal 32 along its entire periphery when in its closed position. Cover 42, when in its closed position, as shown in FIG. 1, blocks off the opening 10 and in conjunction with the seal 32 provides a continuous peripheral seal around the opening 10. Any water entering between the peripheral edges of the cover 42 and the outer wall 20 in the roof 16 is collected within the channel 26 and is drained off via a suitable drain (not shown) connected with the channel 26. Thus, the cover 42, when in its closed position, seals off the interior passenger compartment of the vehicle from all external elements.

The support means 40 supports the operating mechanism 46 and the cover 42. The operating mechanism comprises first and second cam followers 70 and 72, a pair of links 74 and 76, an actuating cam 80 operatively connected with the cam followers 70 and 72 and a manually rotatable knob 82 integral or suitably secured to the cam 80. The cam followers 70 and 72 are circular in shape and respectively include upper disc shaped portions 70a, 72a which are slidably received within the guide track 60 and slide and rest on the ledge 57 between the guide tracks 60 and 62. The cam followers 70 and 72 also have lower depending portions 70b and 72b which are rounded at their free or lower ends and which extend through the slot 62 and beneath the bottom side 63 of the guide track means 50.

The links 74 and 76 are suitably pivotally connected at their upper ends to the closure member 42 adjacent its front and rear ends via pivot means 90 and 92, respectively. The links 74 and 76 are also pivotally connected at their lower ends to the cam followers 70 and 72 via a pivot pin means 94 and 96, respectively. The link 74 and 76 have a length which is greater than the vertical distance between the guide track means 50 and the closure member 42 and their ends which are pivotally connected with the cam followers 70 and 72 are located closer together than their ends pivotally connected with the cover 42, as shown in FIGS. 1-3.

The actuating cam 80 comprises a circular disc shaped member having a horseshoe shaped cam track 100 formed therein, as best shown in FIG. 4. The cam track 100 is in the form of a horseshoe shaped slot extending through the disc shaped member 80 and includes first and second leg portions 102 and 104 and a bight portion 106. The cam 80 is rotatably supported at the center of the support means 40 for rotation about an axis 108. To this end, the cam 80 has an axially extending stub shaft 110 on its side facing the support means 40 which extends through a vertical opening 111 in the support means 40. The stub shaft 110 is retained on the support means 40 via any suitable means, such as a C-shaped spring retainer ring 112. The bight portion 106 of the cam track 100 is radiused so as to lie along an arc which is concentric with the axis of rotation 108 of the cam 80.

The cam 80 is adapted to be rotated by the manual control knob 82. The control knob 82 is hereshown as being formed integral with the cam 80, but could be made separate and suitably secured thereto if desired. The control knob 82 is spaced slightly from the cam 80 and extends just within the passenger compartment under the roof inner panel so as to be readily manually accessible.

Operation of the novel ventilator A will now be described. When the cover 42 is in a closed position, as shown in FIG. 1, it engages the seal means 32 adjacent its entire periphery and is disposed so that its exterior side is flush with the outer roof panel 16 of the vehicle. The lengths of the links 74 and 76 and the position of the cam followers 70 and 72 in the cam track 100 of the cam 80 is such that the cover 42 is held tightly against the seal means 32 so as to cause the upper portion 34 of the seal means 36 to be deformed somewhat to provide a good seal between the cover 42 and the seal means 32. When the cover 42 is in its closed position, the cam 80 and the cam track 100 thereof are in the solid line position shown in FIG. 4. In this position, the cam followers 70 and 72 are engaged with the leg portions 102 and 104 of the cam track 100 adjacent to at the juncture with the bight portion 106. In this position, the cam followers 70 and 72 are in their closest adjacent positions to each other and the cover 42 is held in tight engagement with the seal means 32 due to the fact that the lengths of the links 74 and 76 are such that they force the cover 42 downwardly into tight engagement therewith.

If the operator desires to permit entry or ingress of fresh air into the passenger compartment of the vehicle, he need merely rotate the cam 80 and knob 82 in a clockwise direction, as shown in FIG. 4 (or in a counterclockwise direction, as shown in FIGS. 1-3). As the cam 80 is rotated in a clockwise direction, as viewed in FIG. 4, the cam 80 via the first leg 102 of the cam track 100 will cause the cam follower 70 to be shifted toward the left. As the cam follower 70 is shifted toward the left along the linear guide track means 50, the link 74 thereof will become more vertical and cause the front or first end of the closure member 42 to be raised upwardly from the seal means 32 while the rear or second end of the closure member is caused to rock or pivot about the seal means 32 while remaining in engagement therewith. Note that the link 76 does not move during this movement. The reason that the link 76 is not moved is because the cam follower 72 during this movement merely rides in the bight portion 106 which is concentric with the axis of rotation 108 of the cam 80 and which thus prevents the cam follower 72 from being moved along the guide track means 50. As the cover member 42 is raised at its front end, it will begin to permit air to be received within the passenger compartment. FIG. 2 shows, via the phantom lines, an intermediate open position for the cover 42 and, via the solid lines, the full open position of the cover 42. The phantom line position of the cam follower 72 and the guide track 100 in FIG. 4 corresponds to the phantom line intermediate open position of the cover 42 in FIG. 2. When in the latter position the cam follower 70 is located at the end of the leg portion 102 of the guide track 100 remote from the bight portion 106.

When the operator desires to close the cover member 42 from its front open position, he will merely rotate the knob 82 and the cam 80 in a reverse direction, i.e., counterclockwise as viewed in FIG. 4 (or clockwise as viewed in FIG. 2). When the cam 80 is so rotated, the first leg portion 102 will cause the cam follower 70 to be shifted toward the right towards its closed position, as shown in FIGS. 1 and 4, in which the cover 42 is again in engagement with the entire seal means 32 and located in its closed position. Again, the rear end of the cover 42 during this movement will merely rock and pivot about the seal means 32 while remaining in engagement therewith.

Figure 5:
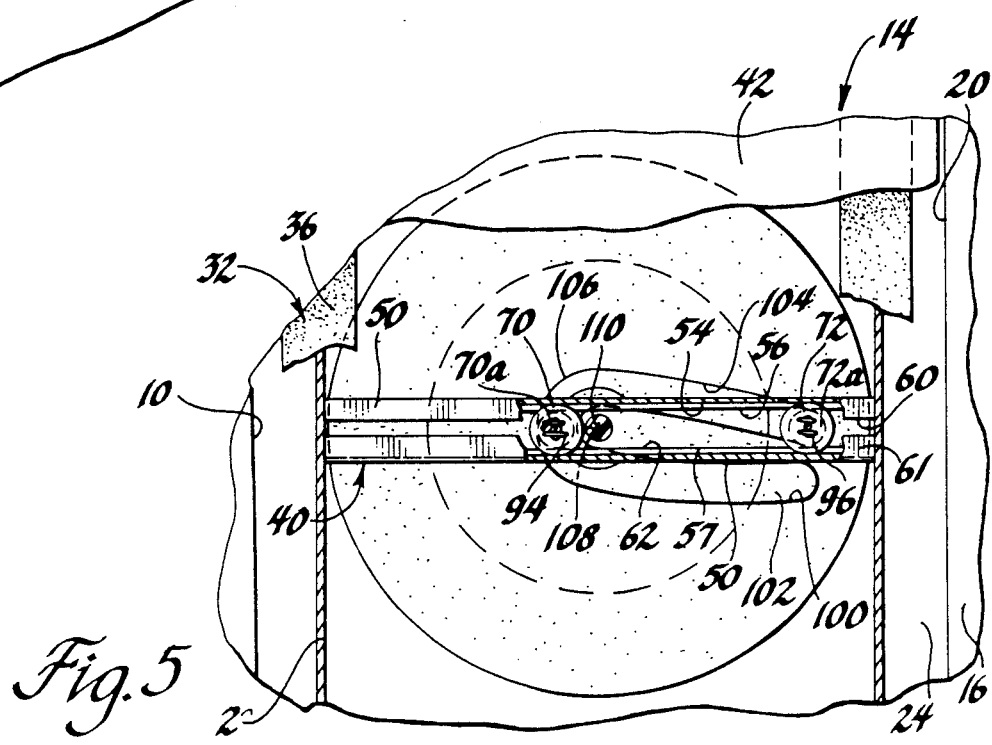
FIG. 5 is a fragmentary view like that shown in FIG. 4, but showing different parts thereof in different positions.

When the operator desires to raise the rear end of the cover member 42 to permit egress of air from the passenger compartment of the vehicle, he will merely rotate the knob 82 and cam means 80 in a counterclockwise direction, as viewed in FIG. 4 (or clockwise direction as viewed in FIG. 1), from the closed position shown in FIG. 1. In the latter position the cam track 100 is positioned normal or transverse to the linear guide track 50. As the cam 80 is rotated in a counterclockwise direction, as shown in FIG. 4, the second leg portion 104 of the cam track 100 will cause the cam follower 72 to be shifted toward the right to cause the rear end of the closure or cover 42 to be raised via the link 76 pushing up thereon while the front end of the closure member 42 rocks or pivots about the seal means 32 while remaining in engagement therewith. The phantom line position shown in FIG. 3 shows the rear end of the cover or closure member 42 in a partially open position and the solid line position shows it in the fully open position. FIG. 5 shows the position of the cam track 100 and cam follower 72 when the cover 42 is in its fully raised rear open position, as shown by the solid lines in FIG. 3. Again, when the horseshoe cam 80 is rotated in a counterclockwise direction, as viewed in FIG. 4, the other link 74 and cam follower 70 remain in their position due to the fact that the cam follower 70 thereof rides in the bight portion 106 of the cam track 100.

When the operator desires to move the cover member from its rear open position, as shown in FIG. 3, back to its closed position, as shown in FIG. 1, he merely reverses the movement of the cam 80 to again cause the right end of the cover 42 to be lowered and pulled into engagement with the seal means 32. Again, the forward end of the cover 42 merely rocks or pivots about the seal means 32 during this movement.

From the foregoing, it should be apparent that a very novel ventilator for opening and closing a roof opening in a vehicle body has been provided. It should also be apparent that the operating mechanism for opening and moving the closure member or cover can be selectively operated to permit either ingress or egress of fluid from the passenger compartment of the vehicle and that the operating mechanism therefor is of a very simple and economical construction and can be readily installed.

Although the preferred embodiment of the ventilator of the present invention has been described with reference to it being a roof mounted ventilator for an automotive vehicle, it should be apparent that the ventilator could be used in other parts of the body structure of the vehicle for ventilation purposes, such as the cowl, or side body, etc. In addition, it should be obvious that the novel ventilator structure of the present invention could be used in applications besides automotive vehicles, and could be used in buses, trucks, boats, etc.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A ventilator for vehicle body structure provided with a ventilating opening in a wall thereof, the ventilator having a support means carried by the vehicle body structure, a closure member supported by said support means for movement between a closed position in which it closes off said opening, a first open position in which a first end thereof is disposed outwardly of said body structure and a second open position in which a second opposite end thereof is disposed outwardly of said body structure, and an actuating means operatively connected with said closure member for effecting movement thereof between its positions, the improvement being that the actuating means includes first and second cam followers operatively connected with said first and second ends of said closure member, respectively, and a rotatable horseshoe shaped cam operatively connected with said first and second cam followers and when rotated in opposite directions from a given position in which the closure member is closed which functions to respectively move said first and second ends of the closure member from its closed position toward its open position while the other end thereof remains closed.

2. A ventilator for a vehicle body provided with a ventilating opening in a wall thereof to permit ingress and egress of air to and from the vehicle body interior, the ventilator having a support means carried by the vehicle body, a closure member supported by said support means for movement between a closed position in which it closes off said opening, a first open position in which a first end thereof is disposed outwardly of said body structure and a second open position in which a second opposite end thereof is disposed outwardly of said body structure, and an actuating means operatively connected with said closure member for effecting movement thereof between its position, the improvement being that the actuating means includes first and second cam followers operatively connected with said first and second ends of said closure member, respectively, and a rotatable horseshoe shaped cam having first and second leg portions and an intermediate curved bight portion, the cam having a first position in which said first and second leg portions thereof adjacent the bight portion are engageable with said first and second cam followers when the closure is in its closed position and the first and second leg portions of said cam respectively effecting movement of said first and second cam followers while the other cam follower rides in the bight portion thereof when the cam is rotated in opposite directions from its first position to respectively effect movement of said first and second ends of the closure member from its closed position toward its open position while the other end remains in a closed position.

3. A ventilator, as defined in claim 2, and wherein said first and second cam followers are pivotally connected to one end of first and second links and with the other end said first and second links being pivotally connected to said closure member adjacent its first and second ends, respectively.

4. A ventilator, as defined in claim 3, and wherein said first and second cam followers are slidably received in a linearly extending guide track.

5. A ventilator, as defined in claim 4, and wherein said horseshoe shaped cam is rotatably supported closely adjacent to said linear guide track.

6. A ventilator, as defined in claim 5, and wherein said horseshoe shaped cam is connected to a manually operable knob for rotating the same.

7. In an automotive vehicle having an occupant compartment and a roof provided with a ventilating opening defined by wall structure including an outer generally vertically extending wall, an inner generally vertically extending wall whose upper edge is located beneath the exterior surface of the roof and a bottom wall which together with the inner and outer walls defines a trough, an elastomeric seal secured to said inner wall and having a compressible upper portion disposed above the upper edge and extending along the entire periphery of said inner wall and an air ventilator supported by said roof for permitting ingress and egress of air through said roof opening to and from the occupant compartment of the vehicle, said ventilator comprising:

a support means including a linear guide track extending longitudinally of said vehicle, a closure member shaped complementary with said opening and which is supported for movement between a closed position in which it is substantially flush with the exterior side of said roof and in which its underside adjacent its outer periphery engages said seal to close and seal off said opening, a first open position in which its front end is disposed above said roof exterior while its rear end remains engaged with said seal and a second open position in which its rear end is disposed above the exterior of said roof while its front end remains engaged with said seal, and an actuating mechanism carried by said support means and operatively connected with said closure member for effecting movement between its positions, said actuating mechanism including first and second links pivotally connected to the closure member adjacent its front and rear ends and pivotally connected to first and second cam followers slidably supported in said linear guide track, said first and second links having a length which is greater than the vertical distance between said guide track and the plane of said closure member and having their ends pivotally connected to their respective cam followers being located closer together than their ends pivotally connected to said closure member, an actuating cam rotatably supported by said support means intermediate its ends for rotation about an axis, said cam having a horseshoe shaped cam track therein which slidably receives said first and second cam followers, said cam track defining first and second leg portions and an intermediate radiused bight portion concentric with said axis of rotation of said cam, said first and second leg portions extending transversely of said linear guide track in said support means and engaging said first and second cam followers adjacent said bight portion when said actuating cam is in a first position to position said closure member in its closed position, said first leg portion of said cam track causing said first cam follower to be moved in said linear guide track forwardly of said roof while said second cam follower rides in said bight portion to move said front end of said closure member upwardly toward said first open position while the rear end thereof rocks on said seal when the actuating cam is rotated in one direction from its first position, and vice versa when rotated in the opposite direction back toward its first position, said second leg portion of said cam track causing said second cam follower to be moved in said linear guide track rearwardly of said roof while the first cam follower rides in said bight portion to move said rear end of said closure member upwardly toward said second open position while the front end thereof rocks on said seal when the actuating cam is rotated in the other direction from its first position, and vice versa when rotated in the opposite direction back toward its first position.

8. In a vehicle, as defined in claim 7, and wherein said linear guide track has a linear extending slot through which depending portions of said cam followers extend and said cam track of said actuating cam is located directly beneath said linear guide track to receive said depending portions.

9. In a vehicle, as defined in claim 8, and wherein said actuating means includes a knob for manually rotating said actuating cam.

10. In a vehicle, as defined in claim 9, and wherein said knob and actuating cam are integrally formed.

* * * * *